United States Patent

Marshall

[15] 3,650,256
[45] Mar. 21, 1972

[54] FUEL EVAPORATIVE CONTROL SYSTEM
[72] Inventor: Charles J. Marshall, Detroit, Mich.
[73] Assignee: American Motors Corporation, Kenosha, Wis.
[22] Filed: Aug. 14, 1970
[21] Appl. No.: 63,699

[52] U.S. Cl. ............................................. 123/136, 137/202
[51] Int. Cl. ................................................. F02m 25/08
[58] Field of Search .............. 123/136, 119 B, 119; 220/85 B, 220/85 VS, 85 VR; 137/202

[56] References Cited

UNITED STATES PATENTS

| 2,860,656 | 11/1958 | Eshbaugh | 137/202 |
| 3,168,103 | 2/1965 | Kochauer | 137/202 |
| 3,477,611 | 11/1969 | Niles | 220/85 B |
| 3,517,654 | 6/1970 | Sarto | 123/136 |
| 2,082,717 | 6/1937 | Parker et al. | 137/202 |
| 2,332,680 | 10/1943 | Wallace | 137/202 |
| 2,913,068 | 11/1959 | Mistarz et al. | 137/202 |
| 2,447,263 | 8/1948 | Mock | 123/119 |
| 3,321,909 | 5/1967 | Gordon | 137/202 |

Primary Examiner—Benjamin W. Wyche
Assistant Examiner—Cort Flint
Attorney—Barbee & Latta

[57] ABSTRACT

A system designed to prevent raw fuel vapors from entering the atmosphere from the carburetor fuel bowl and the fuel tank of a motor vehicle. The carburetor is internally vented and the fuel tank vent line routes the vapors from the tank through a float type liquid-vapor separating valve to the cylinder head cover of the engine. The vapors are stored in the crankcase of the engine while the engine is not operating and combusted during engine operation with the blow-by products by use of the positive crankcase ventilation system.

7 Claims, 6 Drawing Figures

Inventor,
CHARLES J. MARSHALL
By
Barbee & Letta
Attorneys

FUEL EVAPORATIVE CONTROL SYSTEM

BACKGROUND OF THE INVENTION

1. Field of the Invention

This invention pertains to evaporative control systems for vehicle fuel systems.

2. Description of the Prior Art

A conventional fuel evaporative control system may include an internal expansion tank located in the upper portion of the fuel tank and having orifices therein to restrict the passage of fuel into same upon filling the fuel tank. A vapor-liquid separator system is generally connected to the expansion tank to allow the passage of the vapors therethrough and the return of the liquid fuel to the fuel tank. A valve is normally positioned in the vent line beyond the separator and incorporates pressure and vacuum relief means to normalize fuel system conditions inasmuch as the tank filler cap is sealed. The vent line from the valve may be connected to a canister containing charcoal for the adsorption of the vapors, or directly to the engine for vapor storage therein. With a canister, an air purge is necessary to strip the vapors from the charcoal and conduct same to the engine for burning.

SUMMARY OF THE INVENTION

Applicant has designed a system that is characterized by its simplicity of operation and economy of manufacture when compared to the conventional system detailed above. Specifically, applicant has provided a unique float type valve that allows the passage of vapors therethrough but prevents liquid fuel from entering the crankcase. Applicant has dispensed with the charcoal canister, the vapor-liquid separator, and the valve in the vent line. Although the internal expansion tank is utilized to provide expansion space for the fuel, same is not absolutely necessary since, by providing the proper configuration of the tank and the positioning of the filler neck, a suitable back pressure can be obtained to prevent the total filling of the fuel tank. The fuel tank filler cap of applicant's system has vacuum and pressure relief valves which are normally closed and calibrated to open only when an abnormal condition is encountered such as plugged lines or the like. A necessary part of applicant's float type valve is a vacuum relief valve which prevents a vacuum build up when the float valve is closed, to allow the float to open and the liquid fuel to return to the tank. Although theoretically a positive pressure should exist in the valve due to the compression of the vapors therein by the liquid fuel to the extent of the system pressure as determined by the cap pressure relief valve, in actual practice a vacuum is developed. Applicant's vacuum relief valve which is connected to the vent line above the float valve relieves the vacuum and does so without the need of a filter. Applicant has also provided as a safety feature an annular wall around the vacuum relief valve which forms a vapor pocket to insure sealing of the normally closed, flexible vacuum valve and prevents the passage thereby of liquid fuel. Although only a central vent line from the tank to the valve is shown, larger tanks may have dual, diagonally located vent lines connected to the valve. Applicant's system which includes the unique float type valve enables the vehicle to pass most conceivable fore and aft, side grade and maneuvering tests, even with hot fuel. Of course the location of the entire system (including the valve which is located high in the kickup on the underside of the vehicle) outside the passenger compartment also prevents hazards arising from faulty installation or repair.

It is therefore an object of this invention to provide a new and improved evaporative control system for a vehicle fuel system.

Another object of this invention is to provide a new and improved float type valve for use in an evaporative control system for a vehicle fuel system.

DESCRIPTION OF THE PREFERRED EMBODIMENT

Figure 1:
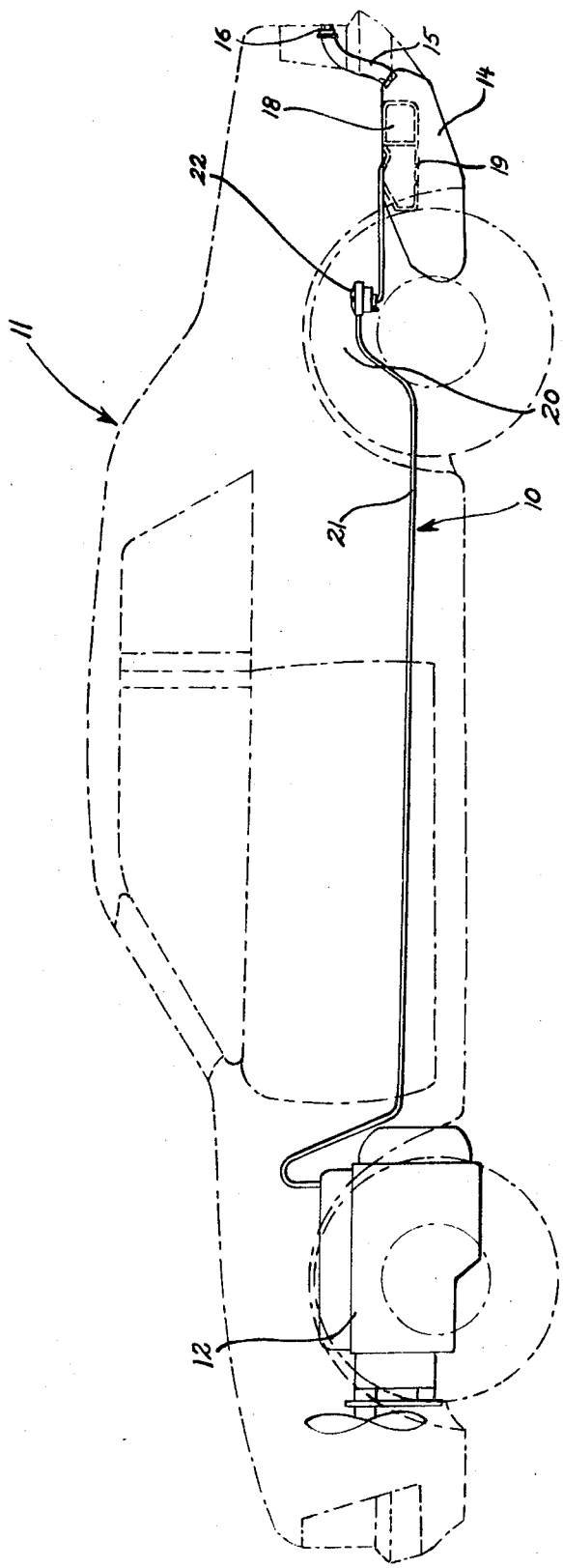
FIG. 1 is a side view of the evaporative control system of this invention mounted on a vehicle which is shown in broken lines.
Figure 2:
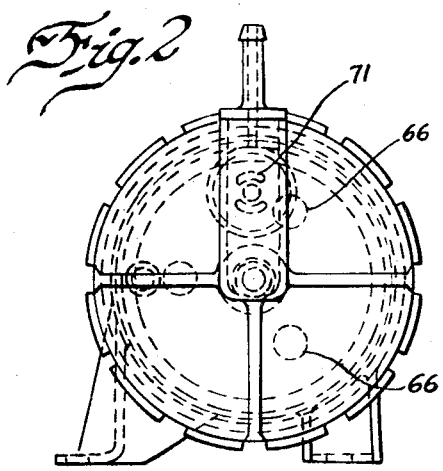
FIG. 2 is a plan view of the float type valve of this invention.
Figure 4:
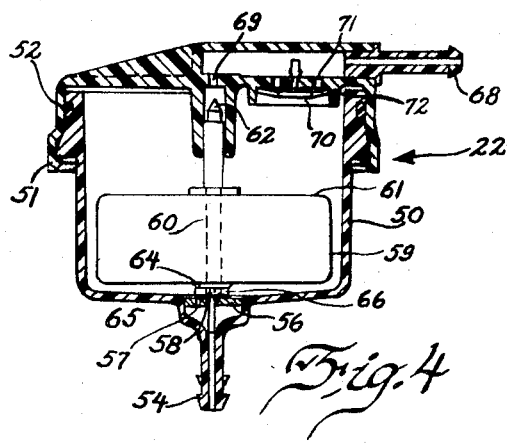
FIG. 4 is a sectional view taken along line 4—4 of FIG. 3.
Figure 3:
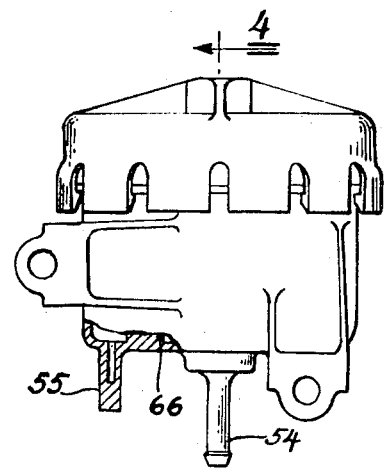
FIG. 3 is a front view of the valve shown in FIG. 2.

Referring to FIG. 1, 10 indicates a fuel evaporative control system for a vehicle 11. Vehicle 11 has an engine 12 located in the front end of the vehicle and a fuel tank 14 at the other end. Fuel tank 14 has a filler neck 15 which is closed by a filler cap 16. Expansion tank 18 is fixedly mounted inside the upper portion of fuel tank 14. A plurality of upper and lower orifices 19 in tank 18 restrict the flow of fuel therethrough during fuel tank filling to provide a thermal expansion volume. Fuel tank 14 is located below the rear floor pan under the vehicle trunk compartment and rearward of the "kick-up" 20. The "kick-up" provides space under the vehicle for the movement of the solid rear axle.

Fuel vent line 21 extends from the upper portion of fuel tank 14, where the line is preferably in communication with the expansion tank 18, to the engine 12. Preferably the vent line is attached to engine 12 at an engine cylinder head cover as shown. A metered hole may be provided in the cover to control the amount of the fuel vapor fumes moving into the engine. Intermediate the ends of vent line 21 and connected thereto is float type valve 22. Valve 22 is mounted in the "kick-up" area on the under side of vehicle 11 above fuel tank 14. Vent line 21 also extends to and from valve 22 on the under side of vehicle 11.

Figure 5:
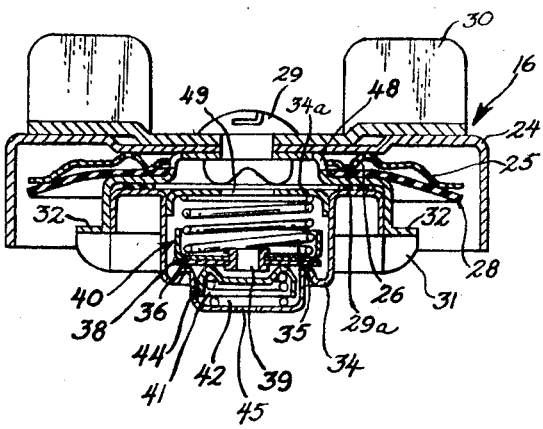
FIG. 5 is an enlarged front, sectional view of the fuel tank cap used with the evaporative control system.
Figure 6:
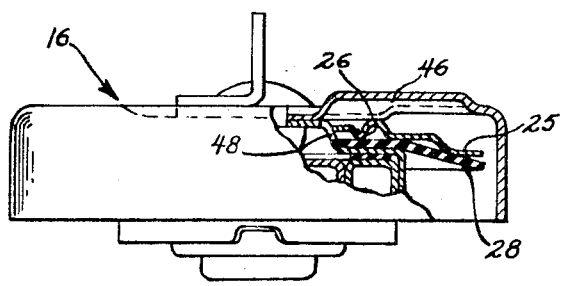
FIG. 6 is a side view (partially in section) of the cap shown in FIG. 5.

Fuel tank filler cap 16, as shown in FIGS. 5 and 6, is of conventional construction. Cap 16 includes shell 24, diaphragm spring 25 having shoulder 26 and gasket 28 which is in sealing relationship with the end of filler neck 15 (not shown). Rivet 29 connects handle 30, shell 24 and cup 31 together. Cup 31 has projections 32 which are adapted to engage cam surfaces (not shown) on filler neck 15 to tighten the cap thereto. Rigidly attached to cup 31 with gasket 29a therebetween is baffle cup 34 having cover 34a which has mounted therein spring 35, seal plate 36, and gasket 38 to form a pressure valve 40. Hollow rivet 39 connects seal plate 36 and gasket 38 together.

Vacuum valve 41 having spring 42 and sealer plate 44 is also located in cup 34. Because of opening 45 in the lower part of cup 34, a vacuum can be applied to vacuum valve 41 thereby compressing spring 42. The vacuum is relieved by outside air which can move through a duct 46 in cap 16, around shoulder 26 and via a passage 48 in cup 31 through aperture 49 in cover 34a and through hollow rivet 39. Normally the vacuum valve opens at 0.5 p.s.i.

Pressure valve 40 will remain sealed with gasket 38 in contact with cup 31 until the pressure exceeds 1 p.s.i. which is sufficient to compress spring 35 to provide communication to the outside atmosphere along the route of the vacuum relief. As mentioned previously the vacuum and pressure valves are closed under normal operating conditions.

Float type valve 22 is shown best in FIGS. 1, 2, 3 and 4. Valve 22 has suitable provisions for being mounted on the underbody of vehicle 11 and includes a housing having a body 50 and cover 51 joined thereto with O'ring 52 therebetween. Body 50 has port 54 which is connected to vent line 21. Although only one vent line is shown, plugged port 55 could be connected to fuel tank 14 should a dual diagonal tank venting arrangement be required. Port 54 has communication with the interior of body 50 even though guide means 56 is interposed in same. Guide means 56 has a plurality of small holes 57 for the passage of vapor therethrough and a larger central guide hole 58 for float element 59. Float element 59 consists of rod 60 which passes through float 61 and culminates in a needle valve tip 62 which may be made of synthetic rubber. Washer 64 and fastener 65 connect rod 60 to float 61 to construct float element 59. Body 50 also has 3 spaced bosses 66 upraised from the bottom thereof to keep float 61 and therefore float element 59 from blocking port 54.

Cover 51 has port 68 which is connected to the vent line 21 for transfer of vapor fumes to engine 12. Located in port 68 is needle valve seat 69 which is adapted to be closed by needle valve 62. Also located in port 68 is vacuum valve 70. Vacuum valve 70 is preferably made of rubberlike material and is adapted to flex and open at approximately ½ p.s.i. vacuum in valve 22. Opening of valve 70 exposes slotted openings 71 to allow vapor from the engine to move into valve 22 to relieve any vacuum therein. Annular wall 72 is supplied to provide an air pocket about vacuum valve 70 in conjunction with liquid fuel to positively seal same.

In operation, fuel vapors from expansion tank 18 and therefore from fuel tank 14 move through vent line 21 to valve 22. The vapors pass through small holes 57 in guide 56 and into body 50. With float element 59 resting on bosses 66, the vapors can move around float 61 and valve seat 69 into port 68. The vapors continue on through vent line 21 to engine 12 for storage therein. Should a drastic increase in ambient temperature occur to expand the liquid fuel, any liquid fuel moving into valve 22 will move float 61 and therefore float element 59 to move the attached needle valve 62 to engage seat 69. Liquid fuel can therefore not enter the engine 12. Annular wall 72 in conjunction with liquid fuel will form an air pocket about vacuum valve 70 to positively seal same, so no liquid fuel can lap around the valve and past same. Continued expansion of the liquid fuel and vapors will cause the pressure valve 40 in cap 16 to open to equalize system pressure. Of course the expansion tank volume and the location of valve 22 are designed to accommodate most conceivable situations.

Upon cooling, the liquid fuel will leave valve 22. Thus the float 61 and therefore float element 59 will drop opening the needle valve 62 to again allow fuel vapors to be stored in the engine where they will be combusted with blowby products via the conventional PCV system. Should any unanticipated vacuum develop in valve 22, the vacuum valve 70 will open and vapor and air at substantially atmospheric pressure from the engine will relieve the vacuum.

From the foregoing, it should be apparent that applicant has provided a system which will work in most conceivable situations with a minimum of components.

I claim:
1. A fuel evaporative control system for a vehicle comprising:
   a. a fuel tank having a filler neck;
   b. a filler cap closing said neck;
   c. a vent line connected to the upper portion of said fuel tank;
   d. fuel vapor storage means connected to said vent line; and
   e. a float type valve connected to said vent line intermediate said tank and storage means, said valve being normally open for the passage of fuel vapors therethrough to said storage means, said valve comprising: a housing, a float element located in said housing and being adapted to close said valve when moved by liquid fuel, and a vacuum valve located in said housing above said float element, said vacuum valve being adapted to relieve the vacuum when said float valve is closed.

2. The system of claim 1 in which said float type valve is located above said fuel tank.

3. The system of claim 2 in which said filler cap has pressure and vacuum relief means located therein.

4. The system of claim 3 further comprising an expansion tank having a plurality of orifices therein, said expansion tank being located in the upper portion of said fuel tank and in communication with said vent line.

5. The system of claim 1 in which said vacuum valve of said float valve is in communication with said vent line and therefore said storage means when said vacuum valve is open.

6. The system of claim 5 in which said float type valve has an annular wall surrounding said vacuum valve to form an air pocket thereabout in conjunction with liquid fuel to positively close said vacuum valve.

7. The system of claim 6 in which said fuel vapor storage means is the engine of the vehicle.

* * * * *